(12) United States Patent
Wang et al.

(10) Patent No.: US 12,536,633 B2
(45) Date of Patent: Jan. 27, 2026

(54) SYSTEMS AND METHODS FOR FOOD ANALYSIS, FEEDBACK, AND RECOMMENDATION USING A SENSOR SYSTEM

(71) Applicant: Samsung Electronics Co., Ltd., Suwon-si (KR)

(72) Inventors: Yibing Michelle Wang, Temple City, CA (US); Radwanul Hasan Siddique, Monrovia, CA (US); Kamil Bojanczyk, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 394 days.

(21) Appl. No.: 17/571,233

(22) Filed: Jan. 7, 2022

(65) Prior Publication Data

US 2023/0153972 A1 May 18, 2023

Related U.S. Application Data

(60) Provisional application No. 63/279,534, filed on Nov. 15, 2021.

(51) Int. Cl.
*G06T 7/00* (2017.01)
*G06N 5/04* (2023.01)
(Continued)

(52) U.S. Cl.
CPC ............. *G06T 7/0002* (2013.01); *G06N 5/04* (2013.01); *G06T 7/62* (2017.01); *G06V 20/68* (2022.01);
(Continued)

(58) Field of Classification Search
CPC ........ G06N 3/0455; G06N 3/084; G06N 3/09; G06N 5/04; G06T 2207/10028;
(Continued)

(56) References Cited

U.S. PATENT DOCUMENTS 9,254,099 B2  2/2016  Connor
9,442,100 B2  9/2016  Connor
(Continued)

FOREIGN PATENT DOCUMENTS

KR  10-2019-0027196 A  3/2019
WO  WO 2019/155220 A1  8/2019
(Continued)

OTHER PUBLICATIONS

Ando, Yoshikazu et al., "DepthCalorieCam: A Mobile Application for Volume-Based Food Calorie Estimation using Depth Cameras", MA DiMa '19, Oct. 21, 2019, Nice, France, 6 pages.
(Continued)

*Primary Examiner* — Kenny A Cese
(74) *Attorney, Agent, or Firm* — Womble Bond Dickinson (US) LLP

(57) ABSTRACT

Systems and methods for analyzing food are disclosed. A first sensor captures first sensor data. A processor determines, based on the first sensor data, whether food has been detected, and invokes a second sensor in response to the determining. The second sensor captures second sensor data. The processor predicts, based on the first and second sensor data, a characteristic of the food. The processor further predicts a body's response to the food based on the characteristic, and outputs a recommendation based on the predicting of the body's response.

20 Claims, 9 Drawing Sheets

(51) Int. Cl.
*G06T 7/62* (2017.01)
*G06V 20/68* (2022.01)
*G16H 20/60* (2018.01)

(52) U.S. Cl.
CPC ... *G16H 20/60* (2018.01); *G06T 2207/10028* (2013.01); *G06T 2207/20081* (2013.01)

(58) Field of Classification Search
CPC ......... G06T 2207/20081; G06T 7/0002; G06T 7/62; G06V 20/64; G06V 20/68; G16H 20/60; G16H 40/63; G16H 40/67; G16H 50/20; G16H 50/70
USPC ........................................................ 382/110
See application file for complete search history.

(56) References Cited

U.S. PATENT DOCUMENTS

| | | | |
|---|---|---|---|
| 9,509,893 | B2 | 11/2016 | Korenaga et al. |
| 9,529,385 | B2 | 12/2016 | Connor |
| 9,536,449 | B2 | 1/2017 | Connor |
| 9,892,501 | B2 | 2/2018 | Dehais et al. |
| 10,207,859 | B2 | 2/2019 | Minvielle |
| 10,314,492 | B2 | 6/2019 | Connor |
| 10,402,980 | B2 | 9/2019 | Mutti et al. |
| 10,458,845 | B2 | 10/2019 | Connor |
| 10,685,488 | B1 * | 6/2020 | Kumar ................... A61H 23/04 |
| 10,803,315 | B2 | 10/2020 | Cho et al. |
| 10,819,905 | B1 * | 10/2020 | Liu ........................ H04N 23/80 |
| 10,919,144 | B2 | 2/2021 | Sinnet et al. |
| 10,971,031 | B2 | 4/2021 | Ortiz |
| 2016/0073886 | A1 * | 3/2016 | Connor ................ A61B 5/4866 600/407 |
| 2016/0140870 | A1 | 5/2016 | Connor |
| 2016/0275362 | A1 * | 9/2016 | Aoki ...................... A61B 5/117 |
| 2017/0323481 | A1 * | 11/2017 | Tran ..................... H04N 23/611 |
| 2018/0149583 | A1 | 5/2018 | Pi |
| 2019/0293620 | A1 | 9/2019 | Farkas et al. |
| 2019/0295440 | A1 * | 9/2019 | Hadad .................. G06F 40/295 |
| 2020/0042816 | A1 | 2/2020 | Gatto et al. |
| 2020/0152312 | A1 * | 5/2020 | Connor ................. G06V 20/20 |
| 2020/0160263 | A1 * | 5/2020 | Kuettner ............. G06Q 10/0832 |
| 2020/0250531 | A1 * | 8/2020 | Rai .................... G06Q 10/0832 |
| 2020/0334628 | A1 * | 10/2020 | Goldberg ........... G06Q 30/0633 |
| 2022/0392609 | A1 * | 12/2022 | Hadad .................... G16H 20/60 |

FOREIGN PATENT DOCUMENTS

| | | |
|---|---|---|
| WO | WO 2020/099498 A1 | 5/2020 |
| WO | WO 2020/111611 A1 | 6/2020 |

OTHER PUBLICATIONS

Min, Weiqing, et al., "A Survey on Food Computing," arXiv:1808.07202v5 [cs.CY] Jul. 16, 2019, 42 pages.

Nawrocka, Agnieszka et al., "Determination of Food Quality by Using Spectroscopic Methods," In Advances in agrophysical research, IntechOpen, 2013, 23 pages.

Subhi, Mohammed Ahmed, et al., "Vision-Based Approaches for Automatic Food Recognition and Dietary Assessment: A Survey," IEEE Access, vol. 7, 2019, pp. 35370-35381.

Tess, "3D scanner smartphone accessory, NutriRay3D, counts calories by scanning your food", Jan. 21, 2016, 4 pages.

https://play.google.com/store/apps/details?id=io.foodvisor.foodvisor&hl=en_US&gl=US, accessed Nov. 2, 2021, 4 pages.

* cited by examiner

| Wavelength [nm] | NIR targets | Wavenumber [cm⁻¹] | Raman targets |
|---|---|---|---|
| Water | | | Water |
| 1454 | 1st overtone O-H stretching | 3200 - 3600 | O-H stretching |
| 1932 | O-H combinations | | Proteins |
| Proteins | | 510, 525, 545 | S-S stretching |
| 1208 | 2nd overtone C-H stretching | 630-670 | C-S stretching |
| 1465 | 1st overtone H-N and O-H stretching | 700-745 | |
| 1734 | 1st overtone C-H stretching | 1235 - 1245 | Amide III (C-N stretching and N-H bending) |
| 1932 | combinations N-H and O-H stretching | 1600 -1700 | Amide I (C=O stretching and N-H bending) |
| Oil | | | |
| 1210 | 2nd overtone C-H stretching | 2550 - 2580 | S-H stretching |
| 1406 | 1st overtone H-N and O-H stretching | 2800 - 3000 | C-H stretching |
| 1718 | 1st overtone C-H stretching | | Fats |
| 2114 | combinations N-H and O-H stretching | 1441 | CH₂ bending |
| Starch | | 1457 | CH₃ - CH₂ bending |
| 1204 | 2nd overtone C-H stretching | 1656 | C=C stretching |
| 1464 | 1st overtone H-N and O-H stretching | 2855 - 2960 | C - H stretching |
| 1932 | combinations N-H and O-H stretching | | Carbohydrates |
| | | 836 | C-C stretching |
| | | 1064 | C-O stretching |
| | | 2912, 2944 | C-H stretching |
| | | 3451 | O-H stretching |

FIG. 5

SYSTEMS AND METHODS FOR FOOD ANALYSIS, FEEDBACK, AND RECOMMENDATION USING A SENSOR SYSTEM

CROSS-REFERENCE TO RELATED APPLICATION(S)

The present application claims priority to and the benefit of U.S. Provisional Application No. 63/279,534, filed Nov. 15, 2021, entitled "PERSONAL NUTRITIONIST ON MOBILE/IoT DEVICES," the entire content of which is incorporated herein by reference.

FIELD

One or more aspects of embodiments according to the present disclosure relate sensor systems, and more particularly to a food sensor system configured to capture and analyze food data for providing feedback and recommendations to a user.

BACKGROUND

More and more people are being affected by metabolic diseases such as diabetes, hypertension, and cancer. Many of the diseases can be linked to the type and amount of food people consume.

The above information disclosed in this Background section is only for enhancement of understanding of the background of the present disclosure, and therefore, it may contain information that does not form prior art.

SUMMARY

An embodiment of the present disclosure is directed to a method for analyzing food. A first sensor captures first sensor data. A processor determines, based on the first sensor data, whether food has been detected, and invokes a second sensor in response to the determining. The second sensor captures second sensor data. The processor predicts, based on the first and second sensor data, a characteristic of the food. The processor further predicts a body's response to the food based on the characteristic, and outputs a recommendation based on the predicting of the body's response.

According to one embodiment, the first sensor is a two-dimensional (2D) camera, and the first sensor data includes a two-dimensional image of the food captured by the 2D camera. The method may further include extracting one or more features from the image; and identifying a food type based on the one or more features.

According to one embodiment, the second sensor is a three-dimensional (3D) camera, and the second sensor data includes depth information of the food captured by the 3D camera. The method may further include computing volume of the food based on the depth information.

According to one embodiment, the second sensor is a polarization camera, and the second sensor data includes a polarization image of the food captured by the polarization camera. The method may further include determining, by the processor, molecular arrangement of the food based on the polarization image.

According to one embodiment, the second sensor is a polarization camera, and the second sensor data includes a polarization image of the food captured by the polarization camera. The method may further include determining, by the processor, freshness of the food based on the polarization image.

According to one embodiment, the second sensor is a spectrometer, and the second sensor data includes wavelength of light absorption or transmittance. The method may further include determining, by the processor, a molecular component of the food based on the wavelength.

According to one embodiment, the characteristic of food includes at least one of food nutrient or food volume.

According to one embodiment, the predicting the characteristic of the food includes: identifying a food type based on the first sensor data; and validating the food type based on the second sensor data.

According to one embodiment, the predicting the body's response to the food includes: invoking a machine learning model for predicting a level of at least one of glucose, triglycerides, or cholesterol, based on the characteristic of the food.

According to one embodiment, the recommendation includes modifying an aspect of the food.

An embodiment of the present disclosure also includes a system for analyzing food. The system includes a first sensor for capturing first sensor data, a second sensor for capturing second sensor data, and a processing system coupled to the first sensor and the second sensor. The processing system includes a processor and memory storing instructions that, when executed by the processor, cause the processor to perform: receiving, from the first sensor, the first sensor data; determining, based on the first sensor data, whether food has been detected; invoking the second sensor in response to the determining; receiving, from the second sensor, second sensor data; predicting, based on the first and second sensor data, a characteristic of the food; predicting a body's response to the food based on the characteristic; and outputting a recommendation based on the predicting of the body's response.

As a person of skill in the art should recognize, embodiments of the present disclosure provide an automated mechanism for predicting food characteristics based on image and other sensor data, which may be used to predict how the user will react to the food. Such feedback to the user may prompt the user to alter his choices in regards to the food.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 5 is an example table of wavelengths and wavenumbers used by a food analysis system to detect food molecules according to one embodiment;

DETAILED DESCRIPTION

Figure 1:
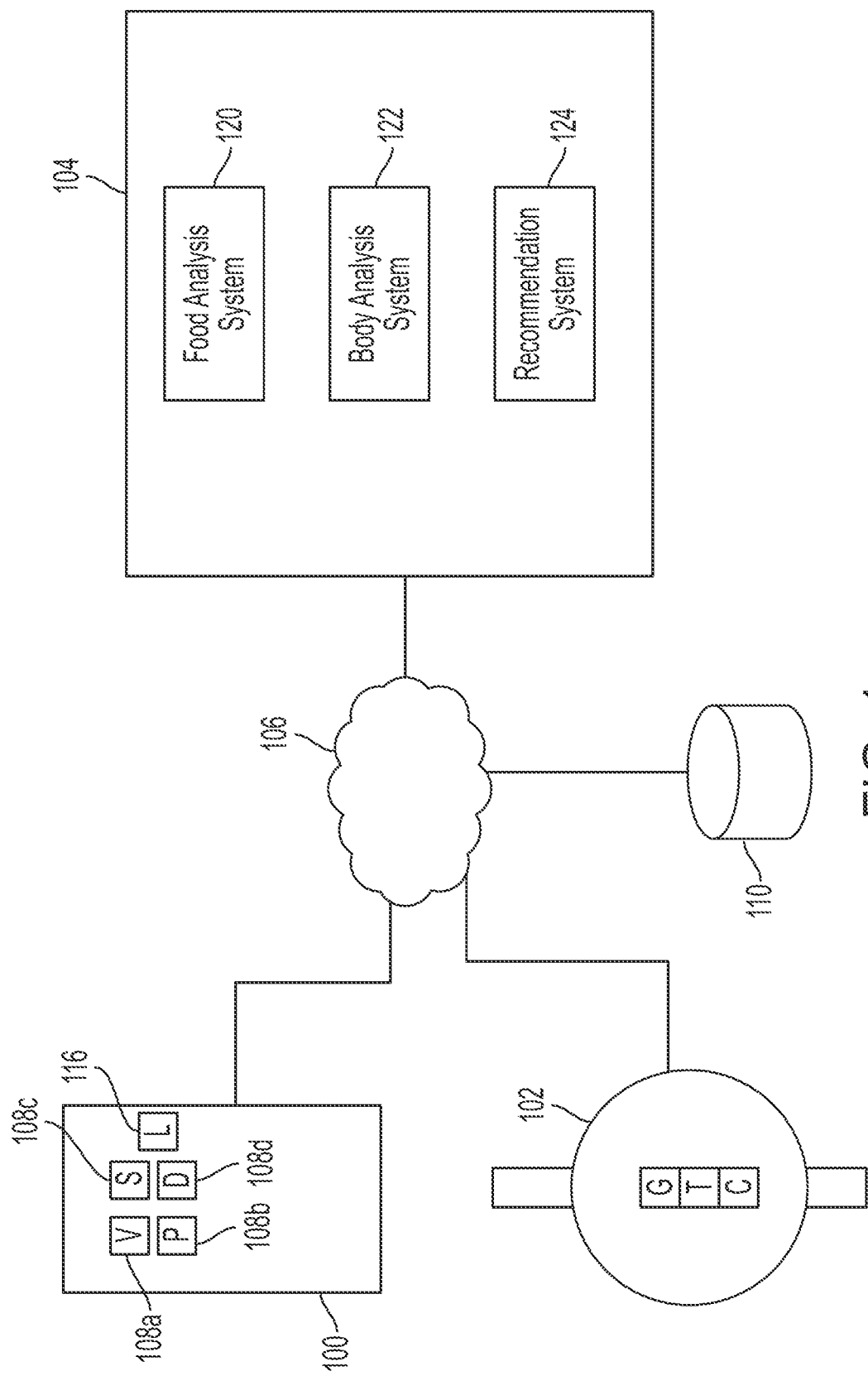
FIG. 1 is a block diagram of a system for performing food analysis, providing feedback, and making food related recommendations, according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Many metabolic diseases such as diabetes, hypertension, and cancer may be affected by the food that one consumes. A current art system exists that attempts to measure quantity, calorie, nutrition, and/or the like, of a meal, by analyzing a 2-dimensional (2D) image of the meal. A problem with the current art system is that the predictions may not be accurate, and may require manual input to correct the predictions.

In general terms, embodiments of the present disclosure are directed to systems and methods for analyzing food using a sensor system. The term food may be deemed to encompass a single food item (e.g. apple, steak, rice, etc.) or a mix of food items with different ingredients incorporated into the food (e.g. spaghetti), or that may be separately identifiable (e.g. salad, hamburger, pizza, etc.). The term food may also be used to refer to a plate or bowl containing different foods (e.g. steak with a side of green beans and mashed potatoes).

In one embodiment, the sensor system includes mobile and/or wearable devices (hereinafter sensing devices) such as for example, 2D cameras, 3D cameras, polarization cameras, spectrometers, glucose monitors, triglyceride monitors, cholesterol monitors, and/or the like. The various sensing devices may work collectively to gather different types of data for the food that is sensed by the sensors. The collected data may be analyzed to generate predictions about the food, and characteristic of the food (collectively referred to as food data), including, for example, food nutrition, content, volume, calorie, and/or the like.

In one embodiment, the analysis system performs separate analyses for recognizing different food characteristics based on the data captured by the different sensing devices. For example, a 2D camera may be used for recognizing a type of food based on captured shape, color, and/or texture information. A 3D camera may be used to identify food volume based on pixel depth information. A polarization camera may be used to detect molecular arrangements (e.g. chirality) of the food, which in turn may be used to detect certain food molecules, based on linear or circular polarization images. A spectrometer may also be used to detect food molecules based on interaction of the food with light. The analysis results for the various sensors may be combined to make the final food data prediction.

It should be appreciated that by using different types of sensors to identify the food and characteristics of the food, accuracy of the identification may increase, when compared to making the identification using a single sensor, such as a 2D camera. In addition, the analysis of the various sensors may be used to cross check the type of food that is recognized and its ingredients, and to further identify fake food from real food. For example, size, texture, and color data obtained by the 2D camera may indicate that the captured food image is that of a hamburger. However, cross checking other sensor data may indicate that although the food may look like a hamburger, molecular properties of the food indicate that the food is a vegan burger where, instead of meat, soybeans are used for the burger patty.

In one embodiment, the food analysis data is provided to a body analysis system for predicting a user's reaction to the food. In this regard, one or more body measurements (e.g. glucose, triglyceride, and cholesterol levels) are obtained from one or more body sensors/monitors, and predictions are made as to whether the sensed body measurements will increase, decrease, or stay the same, if the food were consumed. The prediction may be, for example, based on learning the specific user's reactions to different types of food. Feedback to the user from the body analysis system may thus allow the user to have a better understanding of how food affects the specific user and his health, which may be more accurate than generalized information on different types of food and their effect on health.

In one embodiment, the predicted reaction to the food is provided to a recommendation system to generate personalized recommendations to the user. The recommendation may be, for example, to consume, not consume, or make modifications to the food such as, for example, the quantity of the food, or certain ingredients in the food. The recommendation system may also be configured to make recommendations about food (e.g. what to eat more of) even when there is no food sensed by the sensors.

For example, the recommendation system may make periodic recommendations for encouraging a user to meet diet or other food related goals. The recommendation system may also make recommendations based on sensed triggers, such as scheduled trips or other types of events.

FIG. 1 is a block diagram of a system for performing food analysis, providing feedback, and making food related recommendations, according to one embodiment. The system includes a mobile device 100 and one or more wearable devices 102 coupled to each other and to an analysis and recommendation system 104, over a data communications network 106. The data communications network 106 may be a personal area network (e.g. Bluetooth), local read network (LAN), private wide area network (WAN), and/or the public Internet.

The mobile device 100 may be a personal electronic device that may be carried by a user such as, for example, a smartphone, electronic tablet, and/or the like. In one embodiment, the mobile device 100 includes one or more sensing devices 108a-108d (collectively referenced as 108). The sensing devices 108 may be invoked for capturing sensor data of food to be analyzed. For example, the sensing device may be a 2D camera 108a that creates 2D images of the food by capturing light in a visible portion (red, green, and blue (RGB) wavelengths) of an electromagnetic spectrum.

The sensing device may also be a polarization camera 108b, spectrometer 108c, and/or 3D depth camera 108d. The polarization camera 108b may include a polarization filter/mask configured to enable the polarization camera to capture images of the food with the polarization filter set at one or more specified angles (e.g. 0 degrees, 45 degrees, and 90 degrees). For example, the polarization mask may be a polarization mosaic aligned with the pixel grid of an image sensor in a manner similar to a red-green-blue (RGB) color filter (e.g., a Bayer filter) of a color camera. In a manner similar to how a color filter mosaic filters incoming light based on wavelength such that each pixel in the image sensor receives light in a particular portion of the spectrum (e.g., red, green, or blue) in accordance with the pattern of color filters of the mosaic, a polarization mask using a polarization mosaic filters light based on linear polarization such that different pixels receive light at different angles of linear polarization (e.g., at 0°, 45°, 90°, and 135°, or at 0°, 60° degrees, and 120°). Accordingly, the polarization camera 118b using a polarization mask, may be capable of concurrently or simultaneously capturing light at four different linear polarizations.

While the above description relates to some possible implementations of a polarization camera 108b using a polarization mosaic, embodiments of the present disclosure are not limited thereto and encompass other types of polarization cameras that are capable of capturing images at multiple different polarizations. For example, the polarization filter may have fewer than or more than four different polarizations, or may have polarizations at different angles (e.g., at angles of polarization of: 0°, 60° degrees, and 120° or at angles of polarization of 0°, 30°, 60°, 90°, 120°, and 150°). Furthermore, in addition to a linear polarization filter, the polarization camera 108b may also include circular polarizing filters for capturing multiple polarization raw frames at different circular polarizations. Other implementations of the polarization camera 10b are described in U.S. patent application Ser. No. 17/005,304, filed on Aug. 27, 2020, the content of which is incorporated herein by reference.

In one embodiment, the spectrometer 108c is an optical spectrometer configured to measure properties of light over a specific portion of the electromagnetic spectrum, as the light interacts with the food to be analyzed. In one embodiment, the spectrometer 108c is compact enough to be embedded in the mobile device 100 while still being capable of high angular tolerance. In this regard, the spectrometer may have a dispersion array with a dispersion structure capable of scattering light of a first wavelength and dispersing light of a second wavelength, as described in U.S. patent application Ser. No. 16/914,256, filed on Jun. 26, 2020, the content of which is incorporated herein by reference.

In one embodiment, the spectrometer is configured to produce spectral lines based on the interaction of the food with light, and the wavelengths and intensities of the spectral lines may be analyzed for determining, for example, the amount of interaction (e.g. absorption, reflection, scattering) of the light with the food. Different molecular components found in food may interact differently with different light frequencies. Depending on the detected amount of interaction between the analyzed food and light, the molecular components of the food may be determined.

The 3D depth camera 108d may be configured to measure distance of an object from the camera, referred to as "depth." The 3D camera 108d may be a structured light depth camera, coded light depth camera, stereo depth camera, LiDAR based depth camera, an/or the like. In one embodiment, the 3D depth camera 108d is implemented as described in U.S. patent application Ser. No. 17/393,394, filed on Aug. 3, 2021, the content of which is incorporated herein by reference.

The depth measurement of the food from the 3D depth camera 108d may be used to estimate volume of the food. In this regard, the 3D depth camera may capture a picture of the food from an angle above the food (e.g. along the direction of gravity). The 3D camera 108d may provide the depth of pixels at a top of the food as well as depth of pixels at the bottom of the food. A height of the food may be calculated based on the depth information. The height value, along with an estimated area of the food, may then be used for computing the volume.

The mobile device 100 may also optionally include a light source 116. If no light source 116 exists, ambient light may be used to aid in the capturing one or more of the sensor data.

In one embodiment, the wearable device 102 includes a watch, ear pods, a ring, glasses, a bracelet, and/or the like. The wearable device 102 may also be health monitor inserted into the body such as, for example, a continuous glucose monitor inserted into the skin. The wearable device may be configured to obtain one or more body measurements of a user, on a periodic or non-periodic basis. For example, the wearable device 102 may be configured to measure the glucose level of the user two hours after completion of a meal. Other body measurements taken by the wearable device 102 may include glycogen, cholesterol, insulin, triglycerides, blood pressure, heart rate, and/or the like.

The analysis and recommendation system 104 may include, without limitation, a food analysis system 120, body analysis system 122, and recommendation system 124. The analysis and recommendation system 104 may be implemented via one or more processors and associated memory that may be hosted in a single device (e.g. the mobile device 100) and/or distributed over multiple devices over one or more locations. In one embodiment, a front end of the analysis and recommendation system 104 is hosted on the mobile device 100 as a software application that is downloaded to the mobile device 100. The front end portion may interact with the various sensing devices 108, 102 to collect data, receive user commands, and provide recommendations and other outputs based on the collected data. The processing of the data for may be performed by a back end portion that may be hosted on a device remote from the mobile device 100, such as, for example, a server on a remote cloud computing system.

In one embodiment, the food analysis system 120 is configured to analyze the sensor data of food captured by the various sensing devices 108, and identify one or more characteristics of the food. One or more of the characteristics may be provided to the mobile device 100 as food analysis data for display. The displayed characteristics may include, for example, the name of the food, food volume, ingredients, and/or nutrition breakdown (e.g. calorie, carbohydrates, protein, fat, fiber, vitamins, and/or the like). In one embodiment, the food analysis data is further provided to the body analysis system 122 to receive feedback on the user's predicted reaction to the food if the food were consumed.

The food analysis system 120 may invoke a different algorithm to predict a food characteristic that may depend on the sensor providing the sensor data to be analyzed. For example, a food detection algorithm may be invoked for detecting the presence of food, and the type of food, based on the 2D image captured by the 2D camera 108*a*. The food detection algorithm may extract one or more segments of the food in making a prediction, and extract features of the food segment(s). The extracted features may describe the size, shape, color, texture, and/or the like, of the food segment(s). One or more food types may be identified based on the extracted features. For example, pizza may be identified based on its triangular shape, red color (e.g. sauce), and circular toppings (e.g. pepperoni). Once the particular food is detected, nutrition information for the food may be retrieved from a database storing a list of common foods and their associated nutrition information. The nutrition information my include information that is typically included in a Nutrition Facts label provided by the Food and Drug Administration (FDA) for packaged food.

In one embodiment, the food analysis system 120 invokes one or more of the other sensing devices 108 in response to detecting the presence of food. Analysis of the sensor data provided by the other sensing devices may validate and/or alter the prediction made based on the 2D image data. In this manner the prediction of the type of food, nutrition provided by the food, and/or components of the food, may be more accurate than using 2D image data alone, and may help avoid manual input/validation from the user.

In one embodiment, the additional sensor data to be used in addition to 2D image data includes polarization images from the polarization camera 108*b*. The polarization images may be analyzed for detecting freshness/aging of food, and/or molecular arrangement of the food. As food degrades over time, alterations can take place due to microbial growth and/or oxidation of lipids. The microbial growth may generate certain metabolites, such as glucose, organic acids, carbon dioxide, biogenic amines, and sulfuric compounds, that create visual alterations to the tissue of a food item. For example, older food may have uneven, wrinkled texture, while the texture of fresh food may be smooth. In one embodiment, the food analysis system 120 utilizes the polarization images to conduct tissue analysis (e.g. texture and/or color) to detect freshness/aging of the food.

In one embodiment, the food analysis system 120 may further analyze the polarization images for identifying chiral molecules which may useful for detecting proteins, carbohydrates, and/or the like. For example, some chemical substances are optically active, and polarized light will rotate either to the left (counter-clockwise) or right (clockwise) when the polarized light passes through the substances. The amount by which the light is rotated is the angle of rotation. The direction (clockwise or counterclockwise) and magnitude of the rotation may reveal information about the food sample's chiral properties, such as the relative concentration of enantiomers present in the sample. For example, amino acids are found in proteins in the L-form, whereas carbohydrates are formed of D-saccharides. Examining spectral properties of chiral amino acids may not differentiate between proteins with different chiral properties as they share the same spectral properties. However, analysis of the polarization images may allow distinction of proteins as they have different polarization signatures.

The food analysis system 120 may further invoke the spectrometer 108*c* for identifying the different components of food to be analyzed. Food is generally comprised of water, fat, proteins, and carbohydrates, together with other minor components. In one embodiment, the food analysis system 120 invokes the spectrometer 108*c* for performing spectroscopy in the ultraviolet (UV), visible, infrared (IR), and/or near-IR spectral range. In this regard, the food analysis system may employ absorption spectroscopy, reflection spectroscopy, Raman scattering spectroscopy, Fourier transform spectroscopy, and/or the like, for detecting interactions (e.g. absorption or scattering) of light with the analyzed food, at particular wavelengths. Based on the interaction at the detected wavelengths, corresponding components of the food may be identified. For example, food that contains oil may reveal interaction with the light at a first wavelength, while food that contains starch may reveal interaction with the light at a second wavelength different from the first.

The food analysis system 120 may also invoke the 3D depth camera 108*d* for generating a 3D image of the food to be analyzed. The 3D image may then be used to compute a volume of the food. The volume information may be used to quantify the amount of various nutrients for the food, such as, for example, amount of calorie, fat, carbohydrates, sodium, fiber, and/or the like.

In one embodiment, the food analysis system 120 combines the output of the analysis of the sensor data from the various sensing devices 108, and outputs a prediction of the type of food, as well as characteristics of the food. Cross-validations may be performed based on analysis of the various sensor data to generate a final prediction. For example, the 2D image may capture an image of fake food (e.g. a plastic version of fried chicken) which may, based on the 2D image data alone, be classified as real fried chicken. However, cross-validation based on the analysis of the polarization images and spectroscopy results may reveal that the fake food does not contain any of the proteins, fat, and oil, typical with real fried chicken. Tissue analysis using the polarization images may also reveal that the tissue differs from the tissue of real fried chicken.

In one embodiment, a database system 110 is coupled to the analysis and recommendation system 104 over the data communications network 106. The database system 110 may contain nutrition information of different types of food. The database system 110 may also include wavelength values, wavenumbers, and polarization signatures, for different food molecules. In one embodiment, based upon data provided by the sensors 108, the analysis and recommendation system 104 may retrieve corresponding nutrition/food molecule information. In some embodiments, the database system 110 may contain a library of known food images for being compared against images taken by the 2D camera 108*a* for finding a match.

In one embodiment, the predicted type of food and characteristics of the food (collectively referred to as food analysis data) are provided to the body analysis system 122. The body analysis system 122 may be configured to use machine learning models for predicting the user's reaction to the food if consumed by the user. In this regard, the body analysis system 122 may be configured to receive body measurements from the wearable device 102. The body measurements may include, for example, current glucose level, insulin level, cholesterol level, and/or the like. The body measurements and the predicted characteristics of the food may be provided as inputs to an end-to-end neural network to predict the user's reaction to the food. Of course, other data about the user and/or his physical condition may be used to predict the user's reaction to the food. The end-to-end neural network may be, for example, a neural decoder, encoder-decoder network, and or the like. The output of the neutral network may be predicted body measurement values if the food were to be consumed. For example, the predicted increase or decrease of the user's glucose level may be output as the predicted body measurement based on the inputs to the neural network. Because different people may react to food in different ways, the neural network is trained, in one embodiment, with food reaction data that is specific to the user.

In one embodiment, the recommendation system provides personalized recommendations about the food based on the reaction predicted by the body analysis system 122, and knowledge about the user (e.g. age, medical history, weight goals, etc.). In this regard, the recommendation system may recommend that the food be ingested or not, or recommend modifications to the food (e.g. quantity, food type, etc.). For example, if the user is diabetic, and the food is predicted to raise the glucose level above a recommended level, a decrease in the quantity of the food, or a substitute for the food may be recommended.

In some embodiments, the recommendation system 124 may make recommendations even without the presence of food. For example, recommendations may be made based on current body measurements received directly from the wearable device 102. For example, if the sugar level measured by the wearable device 102 drops below a certain amount, the recommendation system 124 may recommend that the user ingest certain types of food predicted to increase the sugar level. In some embodiments, the recommendation system 124 may also recommend what type of food to eat more or less of, depending on knowledge about the user (e.g. age), his medical history (e.g. current test results), and goals. In some instances, the recommendation may vary based on other information (e.g. travel plans, activities, etc.) provided by the user's calendar. For example, drinking fluids may be recommended based on detecting a scheduled hiking trip.

In the embodiment of FIG. 1, the various systems 120, 122, 124 are assumed to be separate systems. However, a person of skill in the art will recognize that the functionality of these systems may be combined or integrated into a single system, or further subdivided into further sub-systems without departing from the spirit and scope of the inventive concept.

Figure 2:
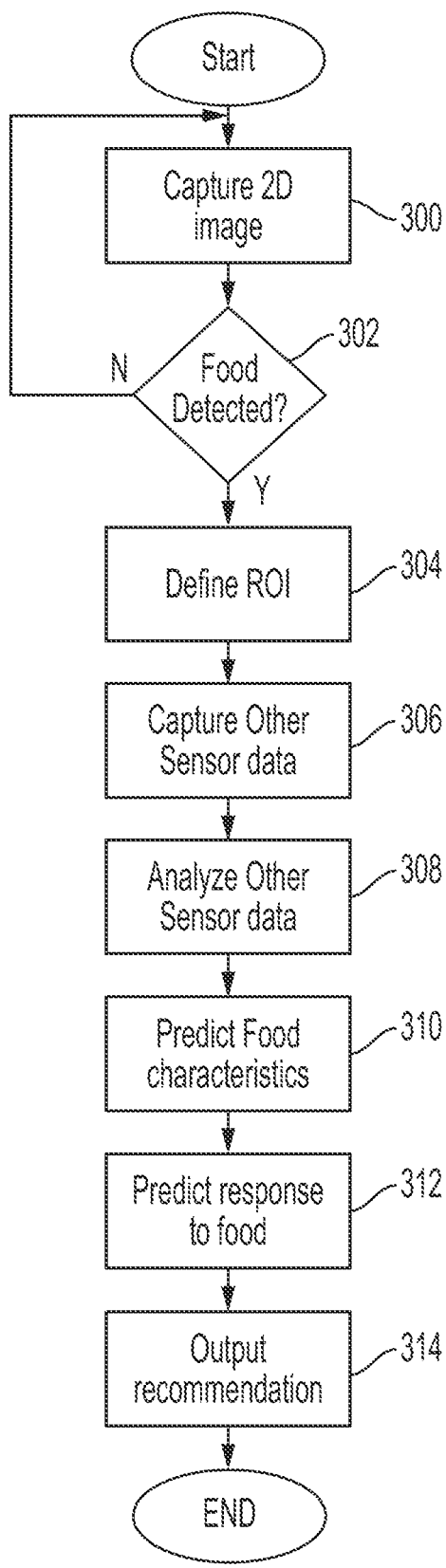
FIG. 2 is a flow diagram of a process for identifying food, providing feedback on the effects of food to the user, and making a personalized recommendation based on the predicted effects, according to one embodiment.

FIG. 2 is a flow diagram of a process by the analysis and recommendation system 104 for identifying food, providing feedback on the effects of food to the user, and making a personalized recommendation based on the predicted effects, according to one embodiment. The process starts, and at block 300, the 2D camera 108*a* captures 2D image of food on, for example, a user's plate. The captured 2D image may be processed by the food analysis system 120, for determining, at block 302, whether food has been detected. The detection may include, for example, an initial prediction as to the type of food, and a confidence level of the prediction.

If food has been detected, a region of interest (ROI) may be defined at block 304. The ROI may define the borders/boundaries of the food to be analyzed. One of various image segmentation methods may be used for identifying the ROI. Such methods may be based on basic properties of pixel intensity values, discontinuity, and similarity. For example, the image of food may be partitioned by analyzing the pixel intensity values and detecting abrupt changes in the intensity, which may indicate edges of the food in the image.

In one embodiment, the food analysis system 120 automatically invokes one or more other sensing devices 108*b*-108*d* in response to detecting food. In one embodiment, the other sensing devices 108*b*-108*d* may be invoked in response to the confidence level of the prediction made based on the 2D image, being above a threshold. In some embodiments, the other sensing devices are invoked regardless of the confidence level (e.g. even when confidence is low), as long as the 2D camera is invoked via the analysis and recommendation system 104. The invoking of the other sensing devices may be transparent to the user. In some embodiments, the user may activate or deactivate certain ones of the sensing devices.

At block 306 the food analysis system 120 captures the sensor data produced by the one or more other sensing devices. For example, the polarization camera 108*b* may be invoked to capture raw polarization images, the spectrometer 108*c* may be invoked for spectral data, and the 3D depth camera 108*d* may be invoked for capturing one or more 3D images of the food.

At block 310, the food analysis system 120 invokes one or more algorithms for analyzing the sensor data from the one or more other sensing devices 108*b*-108*d*. The analysis may provide ingredient and/or nutrition information about the food. For example, analysis of the spectral data may identify nutrition information of the food based on the identified wavelengths and/or wavenumbers. Analysis of the polarization data may also identify nutrition information of the food. In some embodiments, types of nutrition identified from the polarization data may be types of nutrition that share the same spectral data, and hence, may not be identified via spectral analysis alone. For example, the types of nutrition identified from the polarization data may include proteins and carbohydrates. The 3D image provided by the 3D depth camera may be used to compute the volume of the food, which may in turn be used to compute nutrition information such as, for example, calorie.

At block 310, the results of the analysis from the various sensors 108 may be considered together to output a prediction for the food, including, for example, the food name, volume, calorie, nutrition facts, and/or other characteristics of the food. In one embodiment, cross-validations of predictions made by one sensor may be made based on predictions made other sensors. For example, the 2D image may be a picture of food as opposed to real food. In that case, the 3D data from the depth camera 108*d* may indicate no depth information for the food, leading to a conclusion that no real food has been detected.

Even if the 2D picture is for real food, the 2D image of the food may differ from the nutrition found in the food. In this regard, the combination of different wavelengths from the spectrometer, and/or polarization signatures from the polarization images may indicate a type of food that may differ from the image. For example, the food predicted based on the 2D image may be an egg, but analysis of the chemical composition via the spectrometer and/or polarization signatures may indicate that the egg is a vegan egg made up of mung bean protein. The name of the food that is output at block 310 may therefore be "vegan egg" as opposed to "egg," in order to be consistent with the nutrition found in the food.

In yet another example, the identification of the food by the 2D image may be inaccurate due to, for example, the food being cut, cooked, or mixed with other food (e.g. in a bowl). In this case, data from the other sensing devices may help identify the food based on the nutrition information detected by the other sensing devices. In one embodiment, when there is conflict between predictions made by the different sensing devices 108, the prediction agreed by a majority of the sensing devices may win. If there is no majority, the prediction of one sensing device may be given preference over the prediction of another sensing device, depending on a given ranking of the sensing devices. For example, the food predicted based on the chemical components predicted by the spectrometer may be given precedence over the food predicted based in the 2D image, or vice versa, depending on the rankings of the spectrometer and the 2D image.

In one embodiment, the predicted food characteristics are displayed on the mobile device 100. The predicted food characteristics may further be provided to the body analysis system 122 for predicting, at block 312, the user's response to the food. In this regard, the body analysis system 122 may predict an increase, decrease, or no effect in the body measurements monitored by the wearable device 102, should the user ingest the food. In one embodiment, a machine learning model that has been trained based on data specific to the user, is used to predict the effect of the food on the user. The predicted effects of the food may be displayed on the mobile device 100 as feedback to the user.

At block 314, the recommendation system 124 makes a recommendation based on the prediction by the body analysis system 122. The recommendation may be to eat or not eat the food, or change another aspect of the food such as, for example, the amount.

The recommendation may take into account certain goals/factors that the user has indicated. Such goals may include a total number of calories, glucose, fat, and/or the like, to be ingested in a day. The recommendation may also take into account the known medical conditions of the user. For example, for a diabetic user, a recommendation for food that is predicted to raise the glucose level to an amount higher than a threshold value, may be to not to consume the food, or to eat a lesser amount of the food. In another example, if the user is allergic to certain ingredients (e.g. garlic), the recommendation may be to avoid the food that is predicted to contain garlic.

Figure 3:
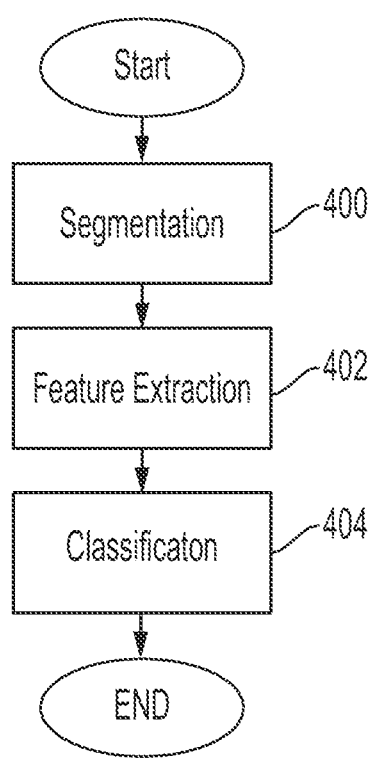
FIG. 3 is a flow diagram of a process for determining whether food is detected using a 2D camera according to one embodiment.

FIG. 3 is a more detailed flow diagram of a process for determining, at block 302 (FIG. 2), whether food is detected using the 2D camera 108*a*, according to one embodiment. The process starts, and at block 400, the food analysis system 120 invokes a 2D food detection algorithm in response to the captured 2D image data. The food detection algorithm may invoke a food segmentation module, at block 400, for segmenting the food. For example, the segmentation module may segment the food into multiple scales that may aid in identification of multiple foods on the plate (e.g. steak with a side of green beans and mashed potatoes), or foods that are composed of different ingredients (e.g. a bowl of salad composed of lettuce, tomatoes, cucumbers, and onions).

The food detection algorithm may further invoke a feature extraction module 403 for extracting different features of the food. In this regard, the feature extraction module may include a histogram of oriented gradients (HoG), an edge orientation histogram, a scale-invariant feature transform descriptors (SIFT), a shape context techniques, and/or spectral residual approach. In some embodiments, the feature extraction module may encode the 2D image with a variety of low-level feature descriptors also referred to as feature vectors. For example, the HoG algorihm may encode texture information in the image, and the SIFT algorithm may encode color information. Other features may also be extracted and encoded into feature vectors such as, as for example, size, shape, and/or the like.

At block 404, the food detection algorithm invokes a classification module to classify the food based on the extracted features. The classification may identify, for example, the name of the identified food (e.g. apple, pizza, salad, etc.).

Figure 4:
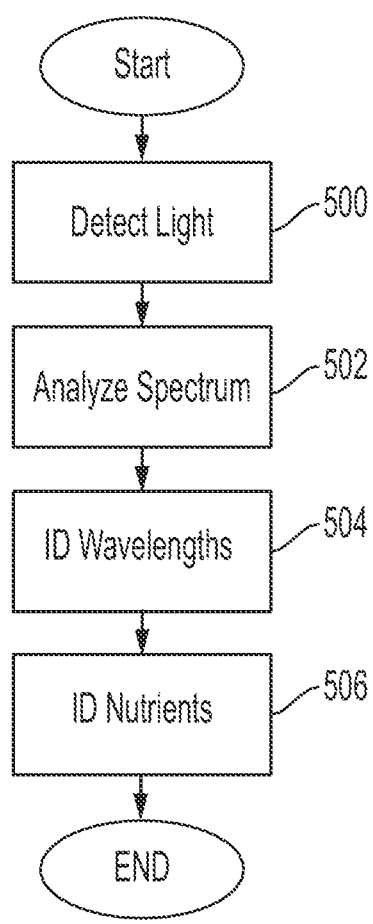
FIG. 4 is a flow diagram of a spectrum analysis module invoked by a food analysis system according to one embodiment.

FIG. 4 is a flow diagram of a spectrum analysis module invoked by the food analysis system 120 according to one embodiment. At block 500, the spectrometer directs light to the food to be analyzed. The light may be any type of light such as, for example, visible, UV, IR, or NIR.

At block 502, the spectrum analysis module analyzes the light spectrum resulting from the interaction with the food. In this regard, the intensity of the resulting light may be analyzed for identifying, at block 504, the wavelength values of the resulting light. The identified wavelengths values may be the wavelengths that have been absorbed, scattered, or otherwise interacted with, the light.

At block 506, the spectrum analysis process identifies the food molecules/nutrition information associated with the identified wavelength values. In this regard, the spectrum analysis process may search one or more stored tables in the database system 110 using the wavelength values as key, and retrieve the food molecules corresponding to the wavelength values.

FIG. 5 is an example table 600 of wavelengths 602 and wavenumbers 604 used by the food analysis system 120 to detect food molecules according to one embodiment. The table 600 may be stored, for example, in the database system 110. The table 600 may be retrieved for use by the food analysis system 120 for predicting a characteristic of food sensed with the spectrometer 108*c*. The table may identify wavelengths 602 or wavenumbers 604 that interact with a particular food molecule 606*a*, 606*b* when light is directed to the food molecule. Different molecules may have different interaction wavelengths or wavenumbers. The interaction may be absorption, scattering, or the like, of the light. For example, when spectroscopy is performed in the NIR range, an interaction may occur between water and light at a wavelength of 1454 nm, while interaction between light and oil may occur at wavelength 1210 nm. Thus, depending on the wavelengths detected, different food molecules may be identified.

Figure 6:
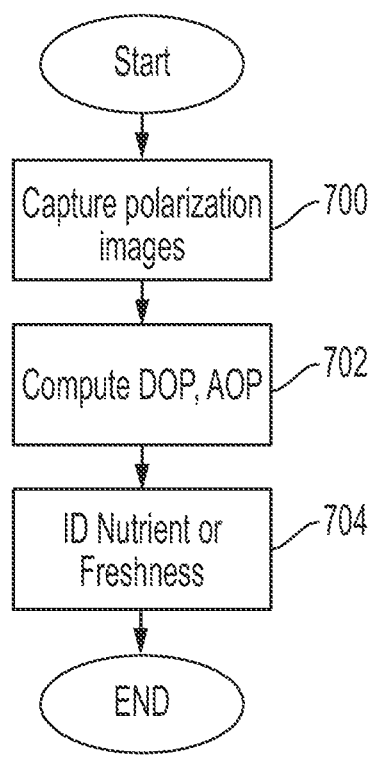
FIG. 6 is schematic layout diagram of a polarization module invoked by a food analysis system according to one embodiment.

FIG. 6 is schematic layout diagram of a polarization module invoked by the food analysis system 120 according to one embodiment. At block 700, the polarization module captures polarization raw frames at different angles (e.g. 0 degrees, 43 degrees, 90 degrees, and 135 degrees). In one embodiment, the polarization images are captured concurrently at four different angles. The polarization raw frames may also include frames from circular polarization, including right-hand circularly polarization light, and left-hand circularly polarized light.

At block 702, the polarization raw frames are processed for computing a degrees of polarization (DOP), and an angle of polarization (AOP). DOP may include a degree of linear polarization (DOLP) and/or a degree of circular polarization (DOCP). AOP may include an angle of linear polarization (AOLP) and/or an angle of circular polarization (AOCP). In one embodiment, DOP and AOP may be calculated using Stokes vectors and applying Mueller calculus.

At block 704, the polarization module identifies the food molecules/nutrients and/or freshness associated with the food based on the identified DOP and AOP (referred to as a polarization signature). The polarization signature may differ based on the food molecules contained in the food. In this regard, different food molecules may produce different polarization signatures. The polarization signature may also differ based on the freshness of the food. In this regard, the texture of food may change depending on the freshness of the food, leading to different DOP and AOP values. For example, fresh food may have a smooth texture that becomes more uneven and wrinkled as the food becomes less fresh. A freshness measure (e.g. a value between 1 to 10) may be assigned to different polarization signatures, and stored in the database system 110 for retrieval by the polarization module at block 704.

Figure 7:
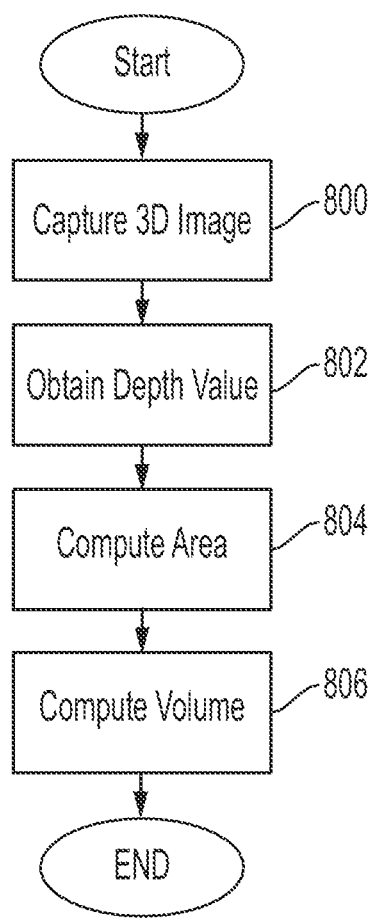
FIG. 7 is a process flow diagram of a volume calculation module invoked by a food analysis system in response to detecting the presence of food according to one embodiment.

FIG. 7 is a process flow diagram of a volume calculation module invoked by the food analysis system 120 in response to detecting the presence of food according to one embodiment. The process starts, and at block 800, the volume calculation module invokes the 3D camera 108*d* for obtaining an image of the food, at an angle above the food (e.g. along the direction of gravity). In some embodiments, multiple images of the food may be obtained from different angles/viewpoints.

At block 802, the volume calculation module obtains the depth value for one or more pixels of the food image for a detected food segment. For example, the volume calculation module may obtain a smallest depth value along a z-axis of a pixel of the food segment that is closest to the camera, and a largest depth value along the z-axis for a pixel of the food segment that is furthest away from the camera. A difference between the largest and smallest depth values may provide a height value for the food.

At block 804, the volume calculation module computes an area of the food by identifying, for example, the value of the pixels along an x-axis, and the value of the pixels along a y-axis.

At block 806, the volume calculation module computes the estimated volume of the food using the computed area and height value for the food. In one embodiment, different volumes may be computed for different segments of the food. The volume information may then be used, for example, for calculating the amount of different nutrients found in the food. In this regard, the calculated volume may be translated to weight based on the type of food that is measured. As a person of skill in the art should appreciate, although two types of food may have the same volume, the weight may vary depending on the type of food. In one embodiment, a table that may be stored in the database system 110 may be retrieved for converting volume to weight, for one or more different types of food.

Figure 8:
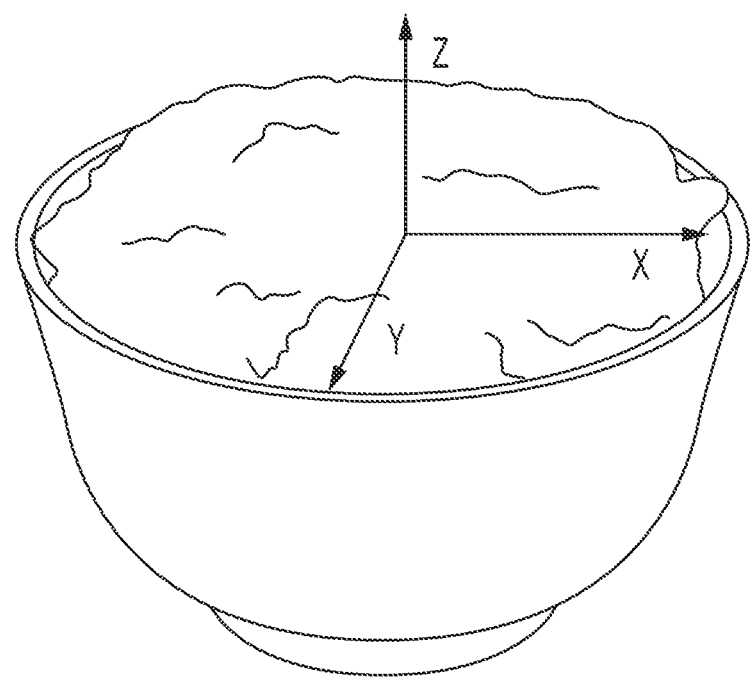
FIG. 8 is an example image of a bowl of rice along with x, y, and z coordinates that may be used for computing a volume of the rice.

FIG. 8 is an example image of a bowl of rice along with the x, y, and z coordinates that may be used for computing the volume of the rice. In this example, a width of the rice along the x-axis, a length of the rice along the y-axis, and height of the rice along the z axis, may be obtained by examining the pixel values at the edges of the food. Volume of the rice may then be computed using the width, length, and height values.

Figure 9:
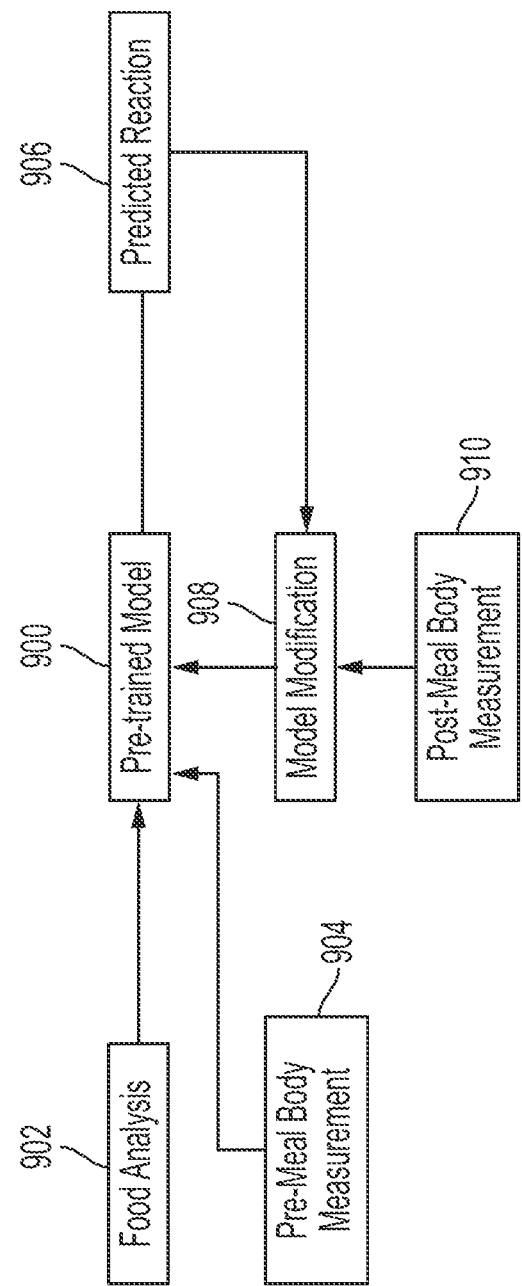
FIG. 9 is a flow diagram of a process for providing feedback to a user based on food analysis data from a food analysis system, according to one embodiment.

FIG. 9 is a flow diagram of a process for providing feedback to a user based on the food analysis data from the food analysis system 120, according to one embodiment. The process starts, and at block 900, the body analysis system 122 identifies a pre-trained machine learning model. The machine learning model may be trained to learn a relationship between different food ingredients and/or nutrients, and the user's reaction to the food. The training data may include sample output data and corresponding sets of input data. The sample output data may include the user's specific reaction to a particular type of food after it's been consumed. The reaction may be, for example, increase or decrease of certain body measurements (e.g. glucose level, insulin level, heart rate, etc.). The input data may include one or more food characteristics (e.g. type of food and associated ingredients and/or chemical components), and body measurements of the user when the food was consumed. A supervised machine learning algorithm such as, for example, linear regression, may be used for correlate the input data to the output. Once trained, the machine learning model may be used for predicting the user's reaction to other types of food, even if the food was not part of the training dataset.

The pre-trained machine learning model 900 receives food analysis data 902 from the food analysis system 120, based on food sensed by the various sensors 108. The machine learning model 900 may also receive pre-meal body measurements 904 from the wearable device 102.

In one embodiment, the machine learning model 900 generates a predicted reaction to the food, if consumed, based on the food analysis data 902 and/or pre-meal body measurements 904. The body analysis system 122 may output the predicted reaction for display, for example, on the mobile device 100 or the wearable device 102. The predicted reaction may further be provided to the recommendation system 124 for making a recommendation based on the predicted reaction. The recommendation may be to consume or not consume the food, and/or make an alteration to the food.

In one embodiment, a determination is made as to whether the food was consumed (e.g. without alterations). If the answer is YES, a reaction to the food is measured, and the data is backpropagated to the machine learning model. The backpropagated data may be used for updating the model, in block 908, if the actual measured reaction deviates from the predicted reaction. If, however, the actual measured reaction substantially matches the predicted reaction, the confidence measure of the prediction may be increased. Post-meal body measurements 910 may also be used to update the machine learning model.

It should be understood that, for the flow diagrams in FIGS. 3-5, 7, 8, and 10, the sequence of steps of the processes are not fixed, but can be modified, changed in order, performed differently, performed sequentially, concurrently, or simultaneously, or altered into any desired sequence, as recognized by a person of skill in the art.

In some embodiments, the food analysis system 120, body analysis system 122, and recommendation system 124 discussed above, are implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another system, element or layer, it may be directly on, connected to, coupled to, or adjacent to the other system, element or layer, or one or more intervening systems, elements or layers may be present.

Although exemplary embodiments of a system and method for food analysis, feedback, and recommendation have been specifically described and illustrated herein, many modifications and variations will be apparent to those skilled in the art. Accordingly, it is to be understood that a system and method for food analysis, feedback, and recommendation constructed according to principles of this disclosure may be embodied other than as specifically described herein. The disclosure is also defined in the following claims, and equivalents thereof.

What is claimed is:

1. A method for analyzing food comprising:
training a machine learning model based on training data including food data and a reaction of a user to the food data;
capturing, by a first sensor, first sensor data of a food item, wherein the first sensor data includes an image of the food item;
determining, by a processor, based on the first sensor data, whether food has been detected,
wherein the determining includes extracting one or more features of the food item, and identifying a first name of the food item based on the extracted features;
invoking, by the processor, a second sensor;
capturing, by the second sensor, second sensor data of the food item;
predicting, by the processor, based on the first and second sensor data, a characteristic of the food item, wherein the predicting includes:
identifying, by the processor, a second name for the food item based on the second sensor data, wherein the second name is different from the first name;
comparing, by the processor, the first name with the second name;
based on the comparing of the first name with the second name;
determining an inconsistency between the first name and the second name;
determining a first ranking associated with the first sensor and a second ranking associated with the second sensor;
determining that the second ranking is higher than the first ranking;
selecting, by the processor, the second name for the food item based on the second ranking being higher than the first ranking; and
predicting, by the processor, the characteristic of the food item based on the second name;
receiving, by the processor, from a third sensor, a body measurement of a user;
predicting, by the processor, a body's response to the food item based on the characteristic, wherein the predicting includes:
providing to the machine learning model, as input data, the characteristic of the food item and the body measurement; and
receiving from the machine learning model, a prediction of a change of the body measurement of the user based on the input data; and
outputting, by the processor, a recommendation based on the predicting of the body's response.

2. The method of claim 1, wherein the first sensor is a two-dimensional (2D) camera, and the first sensor data includes a two-dimensional image of the food captured by the 2D camera, the method further comprising:
extracting one or more features from the image; and
identifying the second name based on the one or more features.

3. The method of claim 2, wherein the second sensor is a three-dimensional (3D) camera, and the second sensor data includes depth information of the food captured by the 3D camera, the method further comprising:
computing volume of the food based on the depth information.

4. The method of claim 2, wherein the second sensor is a polarization camera, and the second sensor data includes a polarization image of the food captured by the polarization camera, the method further comprising:
determining, by the processor, molecular arrangement of the food based on the polarization image.

5. The method of claim 2, wherein the second sensor is a polarization camera, and the second sensor data includes a polarization image of the food item captured by the polarization camera, the method further comprising:
determining, by the processor, freshness of the food item based on the polarization image.

6. The method of claim 2, wherein the second sensor is a spectrometer, and the second sensor data includes wavelength of light absorption or transmittance, the method further comprising:
determining, by the processor, a molecular component of the food item based on the wavelength.

7. The method of claim 1, wherein the characteristic of the food item includes at least one of food nutrient or food volume.

8. The method of claim 1, wherein the predicting the characteristic of the food item includes:
validating the first name based on the second sensor data.

9. The method of claim 1, wherein the predicting the body's response to the food item includes:
invoking the machine learning model for predicting a level of at least one of glucose, triglycerides, or cholesterol, based on the characteristic of the food.

10. The method of claim 1, wherein the recommendation includes modifying an aspect of the food item.

11. A system for analyzing food comprising:
a first sensor for capturing first sensor data of a food item, wherein the first sensor data includes an image of the food item;
a second sensor for capturing second sensor data;
a third sensor for capturing a body measurement of a user; and
a processing system coupled to the first sensor and the second sensor, the processing system comprising a processor and memory storing instructions that, when executed by the processor, cause the processor to perform:
training a machine learning model based on training data including food data and a reaction of a user to the food data;
receiving, from the first sensor, the first sensor data including the image of the food item;
determining, based on the first sensor data, whether food has been detected, wherein the determining includes extracting one or more features of the food item, and identifying a first name of the food item based on the extracted features;
invoking the second sensor;
receiving, from the second sensor, second sensor data;
predicting, based on the first and second sensor data, a characteristic of the food item, wherein the predicting includes:
identifying a second name for the food item based on the second sensor data, wherein the second name is different from the first name;
comparing the first name with the second name;
based on the comparing of the first name with the second name:
determining an inconsistency between the first name and the second name;
determining a first ranking associated with the first sensor and a second ranking associated with the second sensor;
determining that the second ranking is higher than the first ranking;
selecting the second name for the food item based on the comparing second ranking being higher than the first ranking; and predicting the characteristic of the food item based on the second name;
receiving, from the third sensor, the body measurement of the user;
predicting a body's response to the food item based on the characteristic, wherein the predicting includes:
providing to the machine learning model, as input data, the characteristic of the food item and the body measurement; and
receiving from the machine learning model, a prediction of a change of the body measurement of the user based on the input data; and
outputting a recommendation based on the predicting of the body's response.

12. The system of claim 11, wherein the first sensor is a two-dimensional (2D) camera, and the first sensor data includes a two-dimensional image of the food captured by the 2D camera, wherein the instructions further cause the processor to:
extract one or more features from the image; and
identify a second name based on the one or more features.

13. The system of claim 12, wherein the second sensor is a three-dimensional (3D) camera, and the second sensor data includes depth information of the food captured by the 3D camera, wherein the instructions further cause the processor to:
compute volume of the food based on the depth information.

14. The system of claim 12, wherein the second sensor is a polarization camera, and the second sensor data includes a polarization image of the food captured by the polarization camera, wherein the instructions further cause the processor to:
determine molecular arrangement of the food based on the polarization image.

15. The system of claim 12, wherein the second sensor is a polarization camera, and the second sensor data includes a polarization image of the food item captured by the polarization camera, wherein the instructions further cause the processor to:
determine freshness of the food item based on the polarization image.

16. The system of claim 12, wherein the second sensor is a spectrometer, and the second sensor data includes wavelength of light absorption or transmittance, wherein the instructions further cause the processor to:
determine a molecular component of the food item based on the wavelength.

17. The system of claim 11, wherein the characteristic of the food item includes at least one of food nutrient or food volume.

18. The system of claim 11, wherein the instructions that cause the processor to predict the characteristic of the food item include instructions that cause the processor to:
validate the first name based on the second sensor data.

19. The system of claim 11, wherein the instructions that cause the processor to predict the body's response to the food item include instructions that cause the processor to:
invoke a machine learning model for predicting a level of at least one of glucose, triglycerides, or cholesterol, based on the characteristic of the food.

20. The system of claim 11, wherein the instructions that cause the processor to output a recommendation include instructions that cause the processor to recommend modifying an aspect of the food item.

* * * * *